Dec. 12, 1967  G. SELIG  3,358,277
MODULAR TIME AND TEMPERATURE DISPLAY WITH
CAM CONTROLLED SWITCHING APPARATUS
Filed Oct. 29, 1964  7 Sheets-Sheet 1
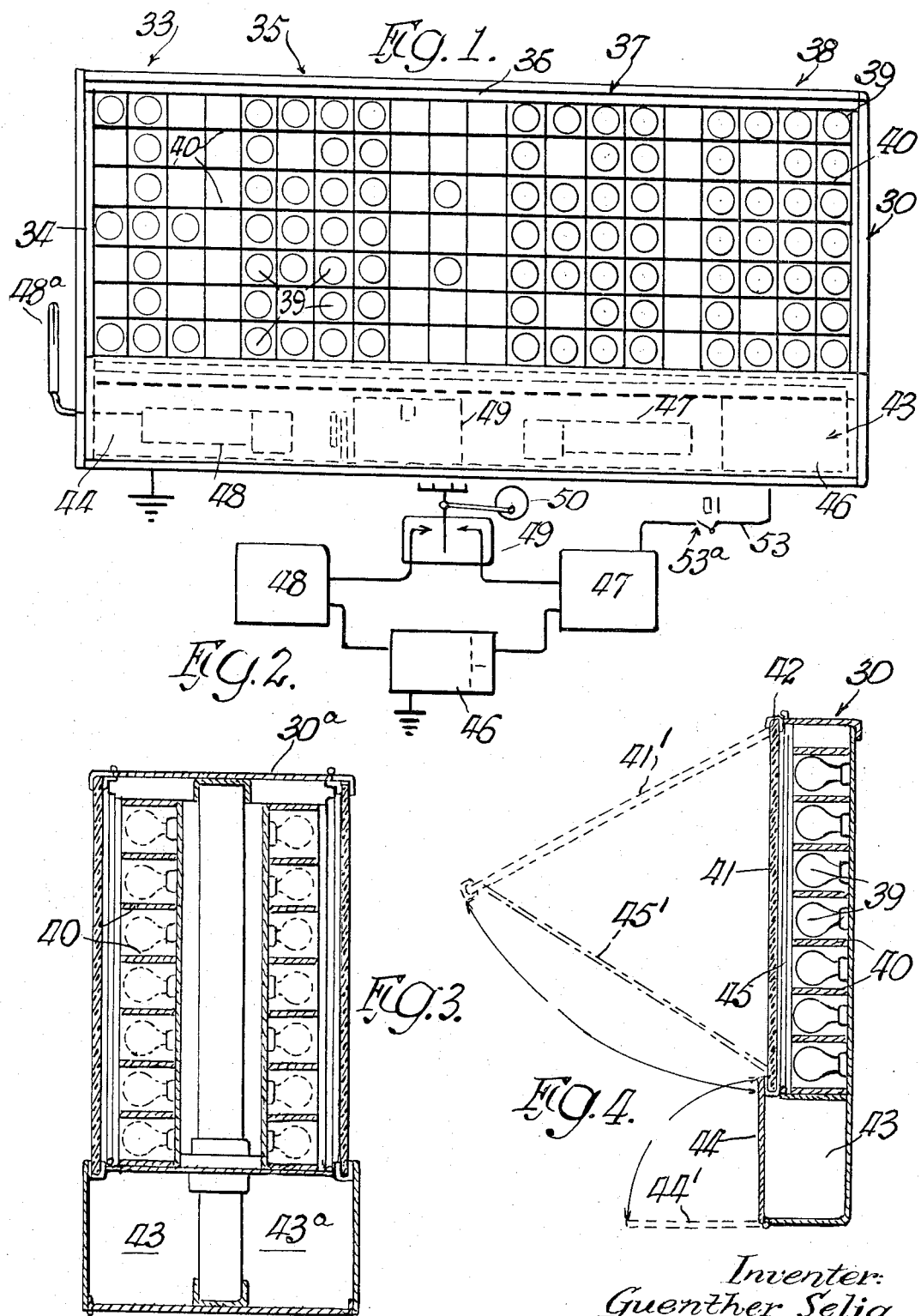
Inventor:
Guenther Selig
by Dunson Titton Fallon,
Lunginus & Alexander Attys

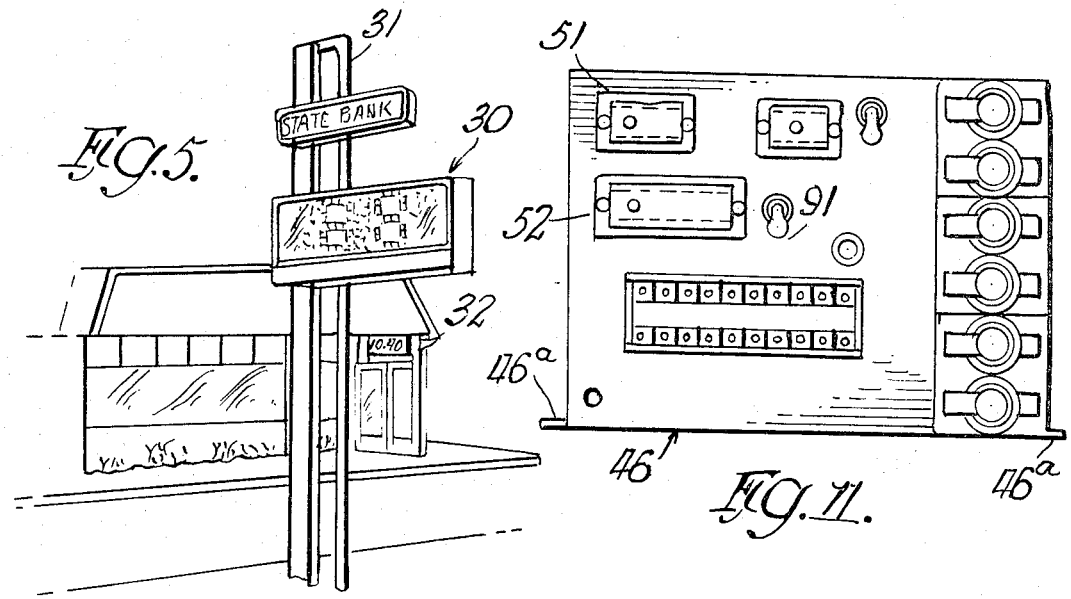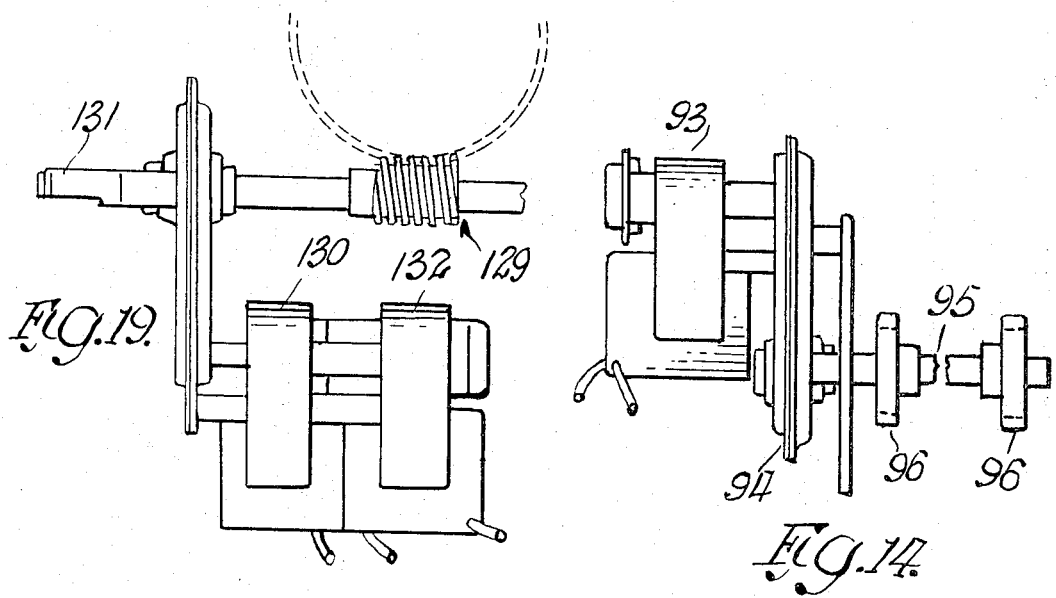

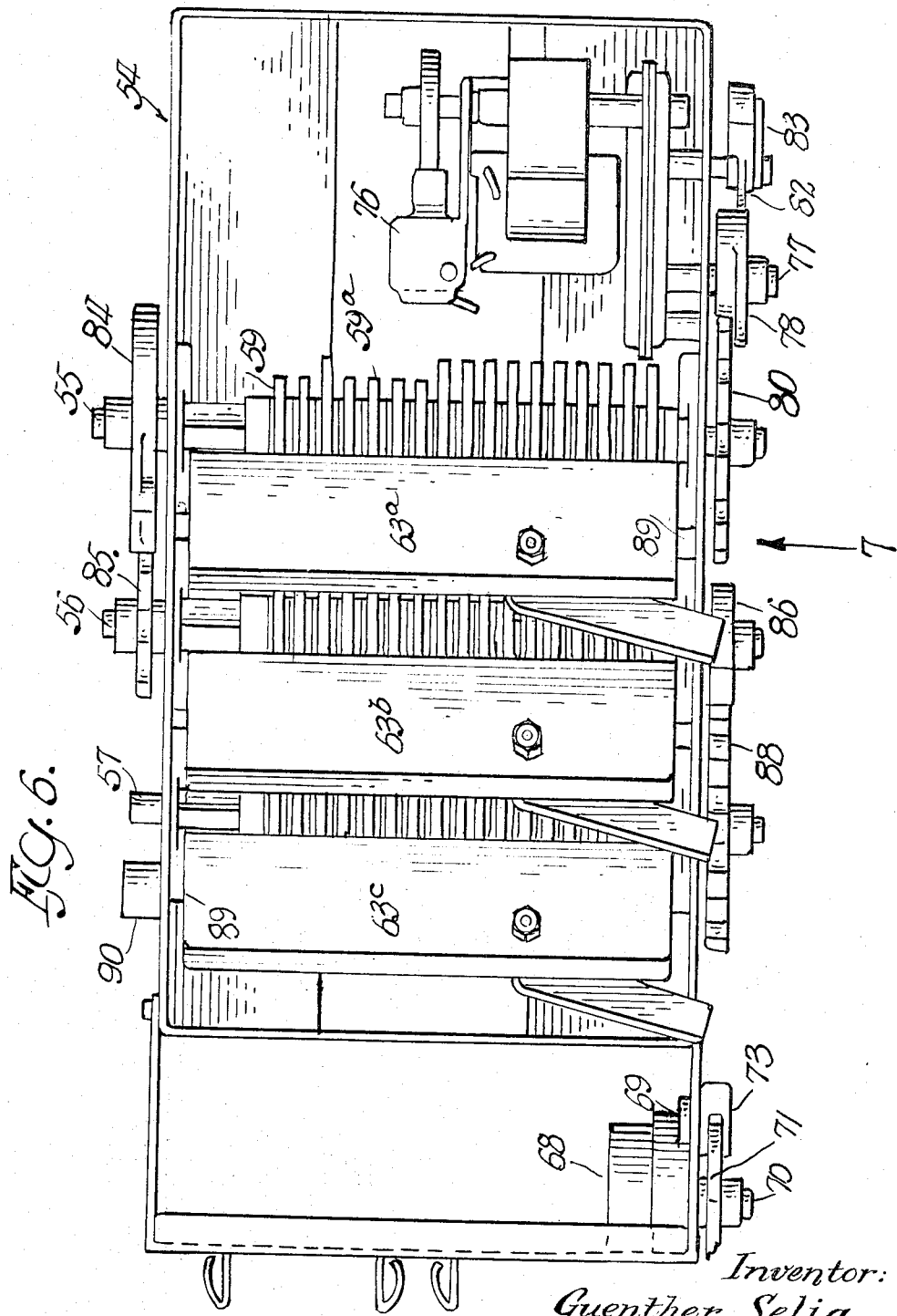

Dec. 12, 1967 G. SELIG 3,358,277
MODULAR TIME AND TEMPERATURE DISPLAY WITH
CAM CONTROLLED SWITCHING APPARATUS
Filed Oct. 29, 1964 7 Sheets-Sheet 4
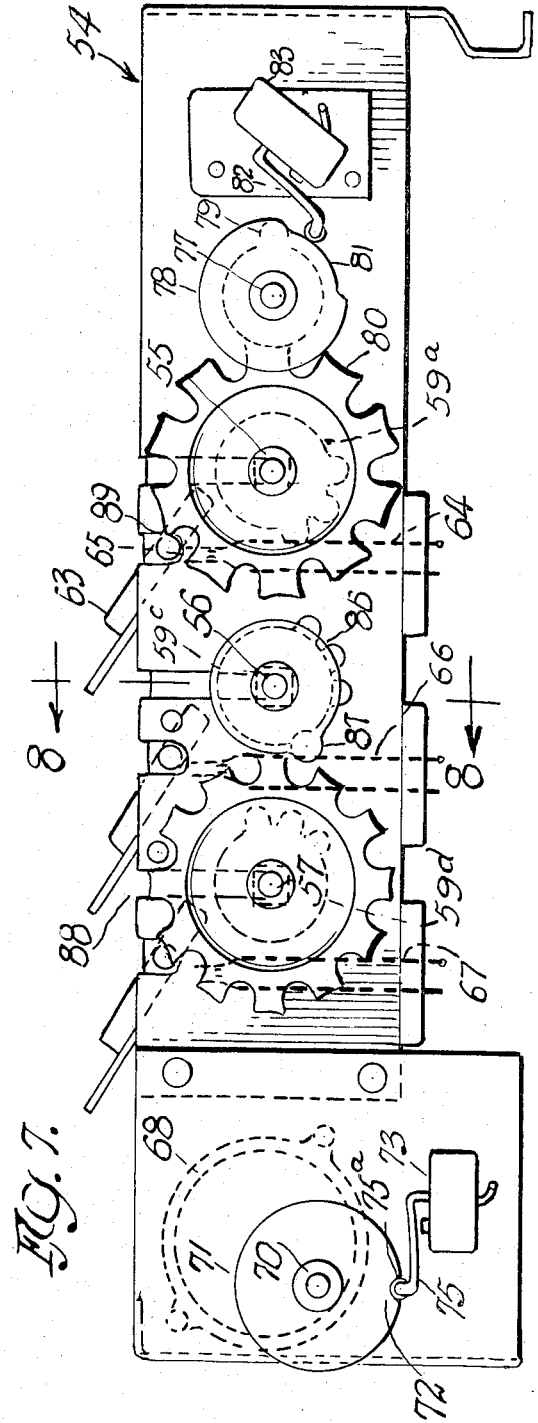
Inventor:
Guenther Selig
by Dawson, Tilton, Fallon
Lungmus & Alexander Attys

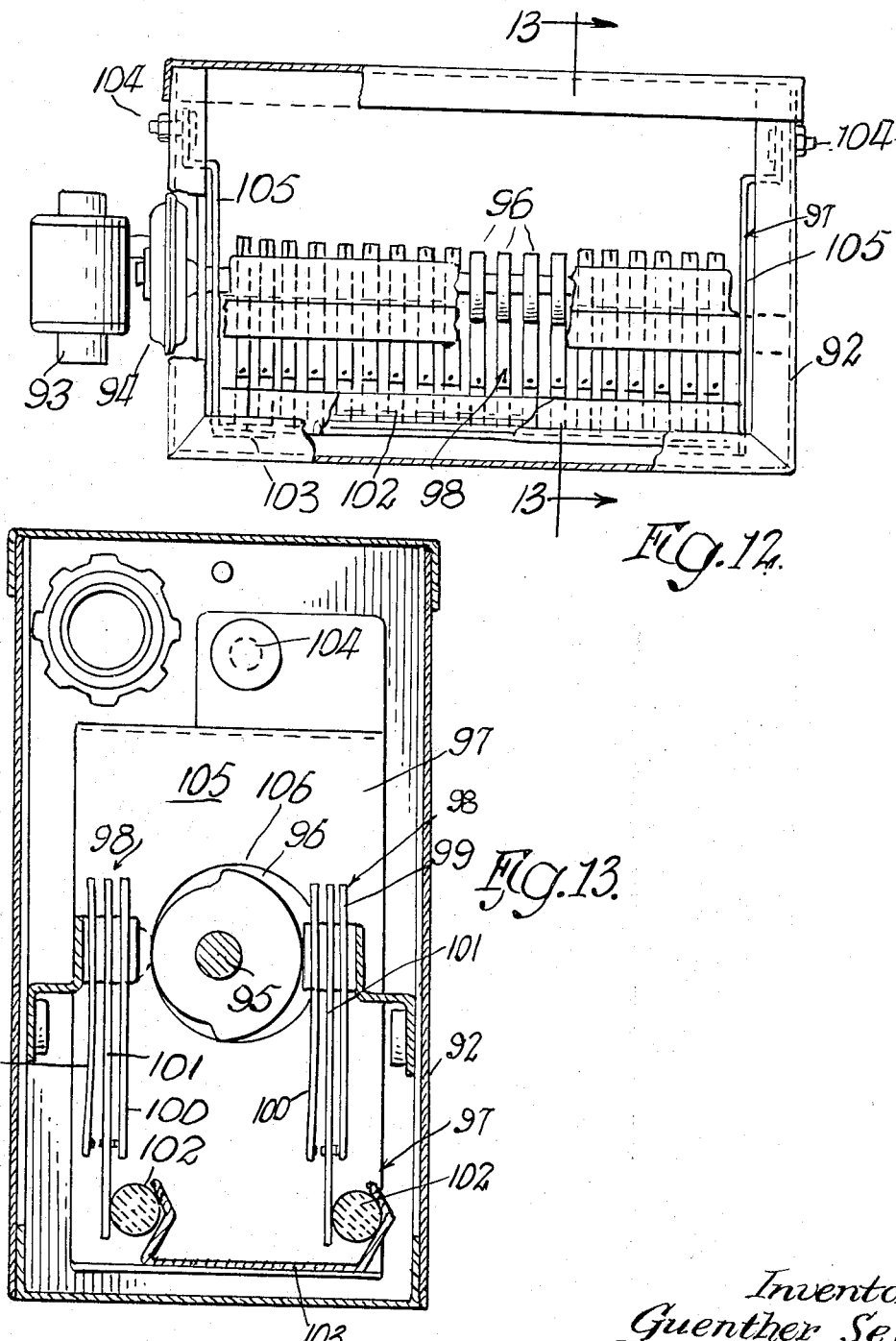

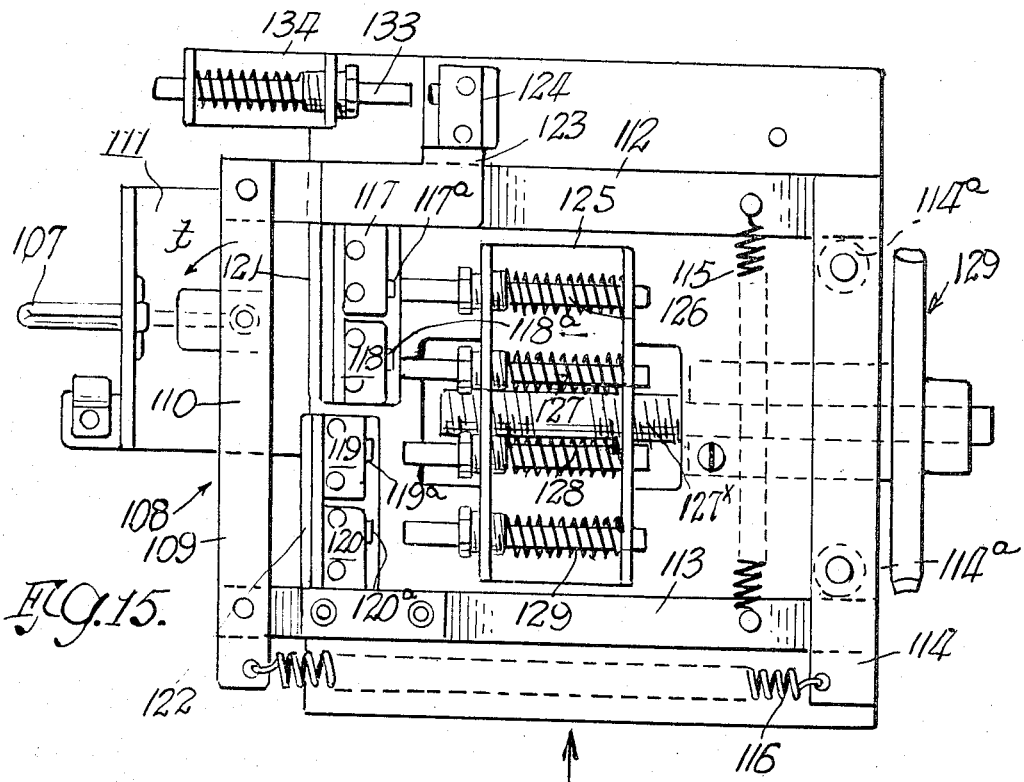
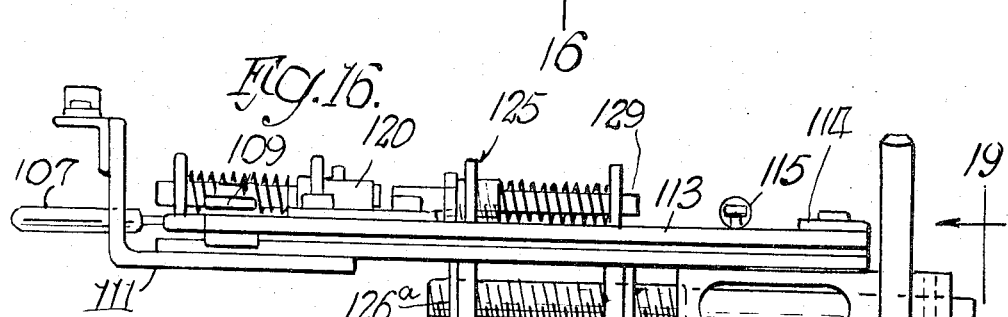
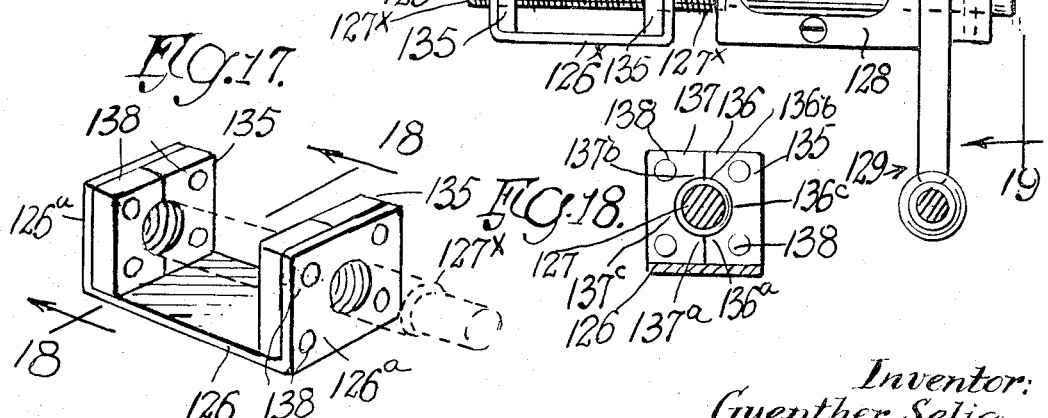

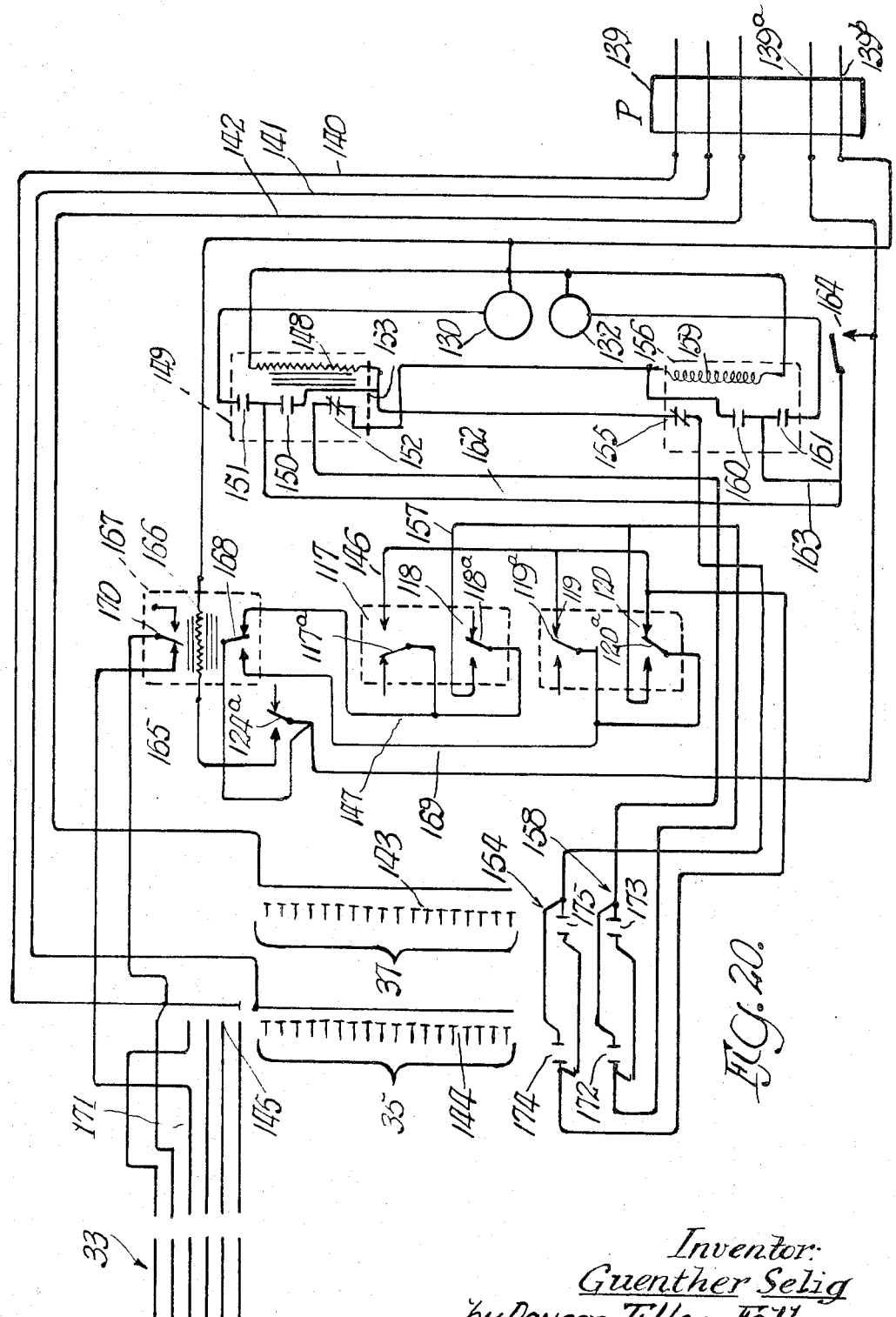

United States Patent Office 3,358,277
Patented Dec. 12, 1967

3,358,277
MODULAR TIME AND TEMPERATURE DISPLAY WITH CAM CONTROLLED SWITCHING APPARATUS
Guenther Selig, Skokie, Ill., assignor to Digit Display Corporation, Chicago, Ill., a corporation of Illinois
Filed Oct. 29, 1964, Ser. No. 407,368
3 Claims. (Cl. 340—338)

This invention relates to a time and temperature display, and, more particularly, to the programming means therefor.

Although the invention has to do with visually depicting time and temperature information—usually alternatively—it will be appreciated that either may be used alone. In fact, since the temperature programming unit is relatively more expensive, in some instances it may be advantageous to make the initial installation report time only. Then, at a later time, the display proprietor may incorporate temperature information. The provision of a display capable of this selective utilization constitutes an important object of the invention. More particularly the invention contemplates the use of modular components which can be selectively added or withdrawn (as for repair) so as to facilitate presenting time or temperature information, or both, as the case may be.

Another object of the invention is to provide a display capable of presenting time and/or temperature information which is characterized by high reliability and ease of servicing, monitoring, and resetting. Each of the just-recited characteristics is important in a time or temperature display—the information being reported thereby having to be accurate. For example, the display must be accurate to one degree of temperature and one minute of time. Performance may be out-of-doors the year round, so that ruggedness is an important feature of the reliability required. Further, because the display is usually at an elevated position, servicing of a faulty component could be relatively difficult. This is avoided in the instant invention. As an incident to servicing, it is valuable to make routine checks, i.e., monitoring the unit from time to time, to see whether all portions are operating properly. In a display capable of four-digit information, light bulbs may be burned out and not immediately apparent to the monitoring serviceman, since these particular bulbs may not be utilized at the specific instant of check. Therefore, another object of the invention is to provide a unique means for monitoring signs of the character just described.

Relative to the time presentation, it will be appreciated that inaccuracies may arise through no fault of the sign— as by power failure. Thus, it becomes necessary to reset the timing programmer, and the invention provides a novel way of doing this, and the provision of such a means constitutes still another object of the invention.

Yet another object of the invention is to provide a novel temperature programmer which is accurate to one degree over the range of about −35° F. to 119° F. and wherein novel elements are provided to eliminate misinformation in the transition between 1° and −1° F. and the possibility of improper operation at sub-zero temperature.

Other objects and advantages of the invention may be seen in the details of construction and operation set down in this specification.

The invention is explained in conjunction with the accompanying drawing, in which—

FIG. 1 is a front elevational view of a time and temperature display constructed according to the teachings of the invention and wherein certain of the modular controlling components are shown in dotted line;

FIG. 2 is a block diagram of the circuit incorporating the dotted line components of FIG. 1;

FIG. 3 is a vertical sectional view through a double-faced display constructed according to the invention;

FIG. 4 is a vertical sectional view through a single-faced display, with the front closure thereof shown in dotted line, open position for easy access to the interior thereof for testing and service operations;

FIG. 5 is a perspective view of the display in a different environment wherein the temperature and time indicators are disposed in spaced-apart locations;

FIG. 6 is a top plan view of the sub-assembly of the timer programmer portion of the display and with the wiring thereof omitted for clarity of presentation;

FIG. 7 is a side elevational view of the timer programmer of FIG. 6 when viewed in the direction of the arrow 7 applied to FIG. 6;

FIG. 8 is a transverse vertical sectional view such as would be seen along the sight line 8—8 applied to FIG. 7;

FIG. 9 is an enlarged detail fragmentary view of one of the switches appearing in dotted line in FIG. 7;

FIG. 10 is an elevational view of one of the actuating cams employed in conjunction with the switches provided in the time programmer;

FIG. 11 is a front elevational view of the fuse and control panel shown in dotted line in the lower right-hand corner of FIG. 1;

FIG. 12 is a view in side elevation of the shuttle assembly shown in dotted line in the central lower portion of FIG. 1, but with certain parts broken away.

FIG. 13 is a transverse vertical sectional view of the shuttle assembly such as would be seen along the line 13—13 of FIG. 12;

FIG. 14 is an elevational view of the motor assembly of the just-referred-to shuttle, presented in fragmentary form;

FIG. 15 is a top plan view of a portion of the temperature controller shown schematically in the lower left-hand portion of FIG. 1;

FIG. 16 is a side elevational view of the structure appearing in FIG. 15 when viewed in the direction of the arrow 16 applied to FIG. 15;

FIG. 17 is a perspective view of the bearing portion of FIGS. 15 and 16;

FIG. 18 is a vertical sectional view taken along the line 18—18 of FIG. 17;

FIG. 19 is a view in elevation of the actuating motor associated with the structure of FIG. 16 and such as would be seen along the sight line 19—19 applied to FIG. 16; and FIG. 20 is a schematic view of the electrical wiring diagram for the temperature controller portion of the display.

In the illustration given and with particular reference to FIGS. 1 an 4, the numeral 30 designates generally a housing for a time and temperature display. The housing is seen to be relatively elongated, and is intended for installation at an elevated site as on the standard 31 in FIG. 5. In FIG. 5, the time display 32 is provided separately from the temperature display as at 30, but in the ordinary installation the time and temperature information are alternated on one lamp assembly.

In FIG. 1, it will be seen that five groups or banks of lamps are provided. Starting from the extreme left, the first bank is designated by the numeral 33 and is employed to supply the numeral "1" for the time between 10 o'clock and 12 o'clock. The "1" in the group 33 is also used for temperature above 100° F., and the central portion of the group as at 34 can be utilized selectively to give a plus or minus sign for elevated and reduced temperatures, respectively. The plus sign is advantageously used when temperatures are in the range +1 to +99° F.

The second group of lamps is designated generally by the numeral 35 and this provides a "tens" digit in temperature and a "unit" digit in time. The third group is generally designated 36, and this group is used only to provide the colon for reporting time.

The fourth group of lights is generally designated 37 and this provides the "tens" of minutes when time is being reported and the "units" when temperature is being reported. The last or farthest to the right group of lamps is generally designated 38 and this is used only for reporting the "units" of minutes in time.

Each group is characterized by a plurality of light bulbs or lamps 39 which are separated one from another by means of an egg carton-type construction 40 which can be characterized as a cellular filler.

The housing 30 (see particularly FIG. 4) is equipped with a louvered screen door as at 41 which is pivotally mounted along the upper edge thereof as at 42 for outward swinging movement to the position shown in dotted line and designated by the numeral 41'.

The housing 30 has a vertical dimension sufficient to provide a compartment chamber as at 43 in which various programming components are housed. The compartment 43 is also equipped with a front access door as at 44 to permit the door to be pivoted downwardly to the position designated 44' in FIG. 4. In this position, the door 44 requires no support, while support in the form of a prop bar 45 (see also the dotted line position 45') is provided for supporting the door 41'.

The various programming units shown in dotted line in FIG. 1 and depicted schematically in FIG. 2 are arranged within the chamber 43, and relative to FIG. 3, it will be seen that two chambers 43 and 43a are provided for a double facing display. In the case of the showing in FIG. 3, the housing 30a is about twice the width of that shown in FIG. 2, so that a double bank of oppositely-disposed sockets and lamps may be employed.

Referring again to FIG. 1, it will be noted that a master panel or fuse panel 46 is provided at the extreme right-hand portion of the chamber 43. The panel 46 is connected to a source of current (not shown), and is interconnected with the time programmer 47 and the temperature programmer 48. Also operably associated with the components 46–48 is a shuttle switch 49. In the ordinary two-information display, the shuttle switch operates cyclically as by means of the diagrammatic cam 50 of FIG. 2 to alternately present signals from the time programmer 47 and the temperature programmer 48. The temperature programmer is advantageously positioned at one end of the chamber 43 so as to accommodate a shorter length of pipe leading to the temperature probe or sensing element 48a.

In the event the installation only carries time information, the shuttle switch 49 and temperature programmer 48 are omitted, but these can be added at any time merely by adding the left-hand modules and making the proper connections with the master panel 46. For example, the master panel 46 is seen in FIG. 11 with a flush mount socket as at 51 for interconnection with the plug-in leads from the temperature programmer. The flush plug-in socket 52 is employed in conjunction with the time programmer, and reference again to FIG. 1 shows that the time programmer, in addition to delivering information to the shuttle switch 49, also delivers information via the conduit 53 directly to the right-hand group of lamps 38. This stems from the fact that this group of lamps is employed only for time. Interposed in the electrical conduit 53 is a relay 53a responsive to the shuttle so that when temperature information is presented, the relay opens so as to remove all power from the banks 36 and 38—it being appreciated that no colon is required for temperature. Further, each modular unit 46–49 is equipped with side flanges as at 46a (see FIG. 11) which facilitate mounting in conjuction with coacting channels in the housing 30 so that units can be added or removed for augmenting or repair, as needed.

Inasmuch as the apparatus may be operated to present only time information, the time programmer will be first described and with particular reference to FIGS. 6–10.

Time programmer

In FIG. 7, the numeral 54 designates generally a box-like housing or frame for supporting the components of the time programmer, which is seen to be electrically interconnected with the fuse panel 46 and the shuttle switch 49 (FIG.1). The frame 54 provides a mount or bearing for three transverse shafts (proceeding from right to left) designated 55, 56 and 57. The shafts 55–57 have to do, respectively, with minutes, ten minutes, and hours. Each shaft, in the portions thereof within the frame 54, has a square cross section as at 58 in FIG. 10 and each shaft 55–57 carries a plurality of cam actuators such as that designated 59 in FIG. 10 which may be obtained from Stock Gears of Des Plaines, Ill. The actuator 59 in FIG. 10 is seen to be equipped with a plurality of lobes as at 60 which are operable to close the switch contacts as at 61 and 62 in FIG. 9. The showing in FIG. 9 has to do with a special testing bar 63 for simultaneously closing all of the contacts in a given row of switches, and which will be described more in detail hereinafter. In the use of the actuator 59, lobes 60 are selectively removed so that rotation of the supporting shaft can selectively close certain switches.

Referring now to FIG. 7, the numeral 64 designates a pair of switch contact arms (shown in dotted line) which are associated with the minutes shaft 55. The contact arms 64 are equipped with actual contacts as at 65. The switch contact arms associated with the ten minute shaft 56 are designated by the numeral 66, and the numeral 67 designates the switch contact arms in FIG. 7 which are associated with the hours shaft 57. It will be appreciated that one set of switch contact arms is provided for each cam actuator 59, so that in FIG. 6, for example, where 17 cam actuators 59 are shown mounted on the minutes shaft 55, there are provided an equal number, i.e., 17, pairs of switch arms 64. The switch arms in the FIG. 6 showing are obscured by the bars 63a, 63b and 63c which are employed in the manner indicated in FIG. 9 for simultaneously closing all of the switch arm contacts, it being appreciated that each pair of switch arms actuates an associated lamp or bulb 39. Again referring to FIG. 6, it will be seen that certain of the actuators 59 as at 59a are narrower than the others, indicating that in the particular configuration shown, lobes 60 have been removed from the actuators 59. Thus, as the shaft 55 is stepped rotationally, each actuator 59 does not close its associated switch contact arm 61 and 62, whereupon the associated light bulb 39 is not illuminated.

Each actuator is equipped with aligned post and recess means as at 59b for the purpose of supplementing the alignment developed by the square shaft 58 and for insuring that the actuators 59 are properly oriented during assembly.

In FIGS. 6 and 7, the numeral 68 represents a synchronous motor suitably secured to the frame 54 as at 69 and which operates at 1 r.p.m. The output shaft 70 of the motor 68 carries a disc cam 71 which is equipped with a single recess 72 (designated only in FIG. 7). An electrical switch 73 also secured to the frame 54 is equipped with a switch arm 75 carrying a roller 75a adapted to ride against the periphery of the cam disc 71. Thus, once each minute the switch 73 is actuated and this in turn supplies current to the main drive motor 76 of the time programmer. The output of the main drive motor 76, through suitable gearing, rotates a shaft 77 (see particularly FIG. 7) on which is carried a Geneva cam 78. The Geneva cam 78 is equipped with a lobe 79 adapted to intermesh with a recess in a second Geneva gear 80 fixed to the shaft 55. Ten such recesses are provided, so that once each minute the Geneva gear 80, and hence the shaft 55, is rotated 36°.

The Geneva cam 78 is equipped with an integral cam disc which is recessed as at 81 (still referring to FIG. 7). Riding against the periphery of the Geneva cam 78 and arranged for cyclic contact with the recess 81 is the roller-equipped switch arm 82 of a switch 83 carried by the frame 54. The switch 83 is arranged in parallel with the switch 73, so that upon cessation of current from the switch 73 to the motor 76, current flows through the switch 83 for the motor 76 to permit it to continue rotating until the Geneva cam 78 has completed one rotation. At the completion of one rotation, the recessed portion 81 returns to the position seen in FIG. 7, whereupon the switch 83 is again opened and no current flows to the motor 76.

An advantageous compactness of the time programmer is achieved by having the Geneva interconnection between the shafts 55 and 56 provided on the opposite side of the frame 54 from the connection between shafts 77 and 55 and from the shafts 56 and 57.

Referring now to FIG. 6, the Geneva drive gear affixed to the shaft 55 is designated by the numeral 84, and this is equipped with an appropriate lobe for engagement once each revolution with a recessed Geneva driven gear 85. The Geneva driven gear 85 is equipped with six recesses corresponding to the number of "tens of minutes" required to be depicted from the last group 37.

The 10 minute shaft 56 is equipped with its Geneva drive gear 86 carrying an integral lobe 87, and this operates to step the Geneva driven gear 88 fixed to the shaft 57. The gear 88 is equipped with twelve recesses corresponding to the 12 hours to be shown on the banks 33 and 35. In FIG. 7, the numeral 59c designates a partially "de-lobed" actuator 59 associated with the shaft 56, while the numeral 59d designates a de-lobed actuator 59 associated with the shaft 57.

In operation, the time programmer is assembled with an appropriate number of switches made up of the switch contact arms 61 and 62. Although 26 lamps 39 are required to be lighted in each of the groups 35, 37 and 38, certain of the lamps only operate in pairs, so that only 17 switches, and therefore 17 actuators 59, are required. Of the 28 spaces, only 26 are utilized, since two of the spaces are never used in forming block letters.

The programming of the switches is achieved by selectively de-lobing the actuators 59 and the actuators 59 are assembled in side-by-side, contacting relation on the three shafts 55–57. Here, it will be appreciated that in the operation of the time programmer the actuators 59 coupled to the lamps in the group 33 are used for only three hours out of each twelve wherein the numeral "1" is required. It is this actuator which is designated 59d in FIG. 7.

The switches associated with each shaft, i.e., the switches 64 associated with the shaft 55, are all transversely aligned and mounted for selective contact with the bank of switches 64 is the previously mentioned bar 63. The bar 63 is pivotally mounted as at 89 (see FIGS. 7 and 9) for this selective action. Thus the serviceman who checks the operation of the installation can test all of the lamps in a given bank merely by causing the bar 63 to be pivoted to bring about simultaneous closing of all the switches 64 in the bank. Advantageously, this is achieved electrically through the use of a solenoid actuated by a radio signal. Thus, the serviceman from his truck can monitor a sign merely by transmitting a radio signal to energize electronic bar-rotating means as at 90 (see FIG. 6).

The output from the various switches 64, 66 and 67 is conducted by conduits (not shown) to the shuttle switch 49 and thence to the various lamps 39. Power is delivered to the controller 54 from the fuse panel (see FIG. 11) as from the flush socket 52 so that in the event of default, the entire frame 54 and its components may be disconnected from the display 30 for repair. In FIG. 11, the numeral 91 designates a time reset switch which is employed to deliver current to the main drive motor 76 so as to maintain the same continually operative until the sign displays the correct time. An occasion for the use of the time reset switch 91 would arise after power failure or upon start-up. It will be appreciated that in addition to having the time reset switch on the fuse panel within the main housing 30, or, alternatively thereto, the switch 91 may be provided at a convenient ground location within the office of the proprietor of the sign.

In the ordinary installation, both time and temperature information will be displayed and, for that purpose, the shuttle switch 49 is employed.

Shuttle

The shuttle operates to alternately present time and temperature information in 5 to 10 second cycles. For this purpose, a shuttle housing 92 (see FIGS. 12 and 13) is provided. Secured to the housing is a shuttle motor 93 (see also FIG. 14) which is operated continuously and through a reduction drive 94 rotates a cam shaft 95. The cam shaft 95 carries cams 96, one of which is seen in FIG. 13. The cams are operative to rock a cradle generally designated 97 for the purpose of selectively closing contacts to deliver either time or temperature information to the lamps 39.

For this purpose, the shuttle housing 93 is equipped with two rows (for the sake of compactness) of switches 98 (see FIG. 13). Each switch 98 includes a first contact arm 99, which may be coupled to the time programmer, and a second contact arm 100, which may be connected to the temperature programmer. Disposed between the arms 99 and 100 is a third arm 101 which is connected to a particular lamp or group of lamps in the display 30. Each arm 101 is secured at its lower end by means of a suitable insulator 102 to a cradle bracket 103. The cradle bracket which extends longitudinally of the housing 92 (see FIG. 12) constitutes an integral part of the cradle 97 and, as such, is pivotally mounted within the housing on the bearings 104. In addition to the cradle bracket portion 103, the cradle 97 includes end walls 105 which are apertured as at 106 to receive the cams 96. Thus, as the cams 96 rotate under the influence of cam shaft 95, the cradle 97 oscillates accordingly so as to contact the switch arms 101 with either the arms 99 or 100, depending upon the position of the cams 96. As the switch arms 101 are contacted with the switch arms 100, temperature information (in the illustration given) is applied to the display 30 and the source of the temperature information, i.e., the temperature programmer, will now be described.

Temperature programmer

The temperature programmer of the invention, in one major respect, is similar to the time programmer. The actual means for closing the switches to deliver current to the various lamps 39 utilizes a lobe actuator and switch arrangement much the same as that pictured in FIG. 7 relative to the time programmer. However, since a maximum of three digits is required for temperature information, as contrasted to four digits for time information, only two sets of actuators are employed, as contrasted to the three pictured in FIG. 7. The essential difference between the programmers lies in the means for signalling the actuator-equipped shafts to rotate. In the case of the time programmer, the intelligence is derived from the synchronous motor 68, which in turn powers the main drive motor 76 and in only one direction. In contrast to this, the switch actuators and, more particularly, their associated shafts in the temperature programmer, must rotate upon signal in either direction, depending upon whether the temperature rises or falls, and further this must be in response to an element sensitive to temperature changes. The temperature-sensing element 48a is connected to a pivotally mounted plunger 107 in FIG. 15. Useful in this connection as the temperature-sensing element 48a is one having an effective range of −30 to +170° F., Catalog No. 217 KLP 110, manufactured by Partlow Corporation, of New Hartford, N.Y.

The temperature sensitive fluid within the element 48a exerts a pressure against the plunger 107 for the purpose of actuating a parallelogram linkage assembly generally designated 108. For this purpose, the assembly 108 includes a lever member 109 pivotally mounted as at 110 on a base plate 111. Thus (still referring to FIG. 15), as the plunger 107 moves to the left in response to a decrease in temperature, the lever 109 pivots counterclockwise in the direction of the arrow designated −t. An increase in temperature results in clockwise pivoting of the lever 109. The linkage assembly 108 further includes links 112 and 113 which are pivotally interconnected with the lever 109, along with a link retainer 114. A spring 115 interconnects the links 113 and 112 to urge the same against abutments 114a on the retainer 114 whereby the links 112 and 113 may pivot or slide as required under the urging of plunger 107. A second spring 116 (omitted from the showing in FIG. 16) interconnects the retainer link 114 with the lever 109 to urge the plunger 107 into the temperature probe unit 48a. Through the linkage assembly 108, a small movement of the plunger 107 is magnified for the purpose of moving the switches 117–120. The switches 117 and 118 are carried on a bracket 121 extending into the assembly 108 from the link 112, while a second bracket 122 extending inwardly from the link 113 supports the switches 119 and 120. Further, a bracket 123 supports a fifth switch 124 which is used at the zero or transition point.

Centrally disposed within the linkage 108 is a sled assembly generally designated 125 and which is equipped with four spring-loaded plungers 126, 127, 128 and 129 for coaction, respectively, with switches 117–120. The sled assembly 125 is equipped with a depending bracket 126x which threadedly receives a sheft 127x. The shaft 127x is threadedly carried by a bearing mount 128 provided as part of the base plate 112 and the sled 125 is positioned relative to the switches 117–120 by a worm gear assembly generally designated 129.

*Operation of temperature programmer*

When the temperature is above zero, the elements of the temperature programmer will be generally in the configuration seen in FIG. 15. When the temperature is stable, the plunger 126 is in contact with the switch plunger 117a of the switch 117, and the system is at rest. Upon decrease in temperature, the plunger 107 is retracted to pivot the lever 109 counterclockwise, i.e., in the direction of the arrows designated −t. This breaks the contact between the plunger 126 and the switch plunger 117a so that a signal is sent to the motor 130 (see FIG. 19). To actuate the worm gear assembly 129 and reposition the sled 125 so as to once again bring the plunger 126 into contact with the switch plunger 117a. Contemporaneously, power from the worm shaft 131 is delivered to a lobe actuator unit of the character seen in FIGS. 6 and 7 for the purpose of changing the number on the display 30.

Upon increase in temperature, the lever 108 pivots in a clockwise fashion and ultimately brings the switch plunger 118a into contact with the plunger 127. It will be noted that normally the switch plunger 118a is spaced from the end of the plunger 127. When this occurs, current is delivered to a second motor 132, which rotates the worm shaft 131 in the opposite direction from that provided by energization of the motor 130 so that the sled 125 is moved to the right in FIG. 15, once again breaking contact between the plunger 127 and the switch plunger 118a. During this time, the plunger 126 remains in contact with the switch plunger 117a so that no current is delivered to the motor 130. As before, rotation of the worm shaft 131 results in a corresponding movement in the lobe actuator unit (not shown) associated with the temperature programmer so as to raise the value of the temperature shown by illuminating lamps in the display 30.

The lobes are so arranged in the actuators associated with the temperature programmer so that between +1 and 99° F. the five central lamps 39 in the group 33 are illuminated to develop a "+."

As the lever 109 is pivoted more and more in a counterclockwise fashion until zero is reached, the bracket 123 is correspondingly pivoted until the switch 124 engages the spring-loaded plunger 133. Plunger 133 is carried by a bracket 134 rigidly fixed to the base plate 111. At this particular condition of the apparatus, the switches 117 and 118 are de-energized, and when the temperature falls to −1° F., the switches 119 and 120 are energized.

The switch 120 has its plunger 120a normally in contact with the plunger 129 and will break contact upon increase in temperature, thereby energizing the motor 130 so as to reduce the actual numerical value of the number placed on the sign, i.e., from −7 to −6° F. The switch 119 comes into contact with the plunger 128 upon further decrease in temperature, and this actuates the motor 132. Both switches, of course, also cause the worm shaft 131 to rotate to reposition the sled 125 so as to bring about the equilibrium condition where the plunger 20a is contacted by the plunger 129 but the plunger 119a is spaced from the tip of the plunger 128.

Whenever the switches 119 and 120 are energized, a suitable signal is provided to the group of lamps 33 to use only the three central lamps in the form of a "−" sign.

Inasmuch as mechanical movement is utilized to actuate the various switches 117–120, it is important to make sure there is no backlash in the gearing, binding in the various connections, etc. This becomes apparent from the fact that the plunger 107 moves only of the order of 0.0008" per degree temperature change. Through the multiplication developed by the quadrilateral parallelogram linkage 108, this is increased to 0.002 inch per degree. Even so, it is important to insure quick, smooth movement of the sled, for example. At reduced temperature in outdoor locations, even the best lubricant becomes only semi-effective after becoming contaminated with dust, and the like.

We have found that the undesirable binding of the sled relative to the threaded member 127x can be avoided by the elimination of lubrication, making use of plastic bearings as at 135 in FIGS. 17 and 18. For this purpose, we provide a split bearing (see particularly FIG. 18), wherein the two halves 136 and 137 are secured to the upstanding legs 126a of the bracket 126x by means of suitable bolts 138. The two halves 136 and 137 are threaded so as to have just sufficient engagement with the threads of the member 127x for positive advancement. With a good threaded fit, upon reduction of temperature, the bearings ordinarily would contract to such an extent that the threaded connection would be frozen and therefore ineffective for the purpose intended. However, by making use of the split bearing with the loose threaded fit as indicated, sufficient engagement with the threads of the member 127x is assured under all conditions. Where, for example, the temperature decreases substantially, the portions 137a and 137b move toward each other, while the portion 137c moves away from the threaded member 127x. Upon increase in temperature, the reverse occurs, so that at relatively elevated temperatures the member 127x engages the portions 136 and 137 in the areas designated 136c and 137c. When temperatures are below zero, the engagement is in the vicinity of the areas marked 136a, 137a, 136b and 137b. A plastic material found advantageous for this purpose is marketed by Du Pont under the trade name Delrin.

Reference is now made to FIG. 20 to further explain the operation of the temperature programmer and further to describe certain features which are advantageously employed in the small, compact, modular unit heretofore described. First, it should be appreciated that the reporting systems employed are all electromechanical—as contrasted to electronic—so that deterioration of electronic elements (especially during temperature extremes) is not a factor. The sign is usually installed outdoors so as to be exposed to temperature extremes, and further the unit is desirably inexpensive so that elaborate protective arrangements are not possible. The foregoing advantages are achieved by the electromechanical programmers used in the invention.

In FIG. 20, the four sled-engaged switches 117–120 are again shown, but here schematically. Power to these is delivered via plug 139 adapted to be connected to the receptacle or socket 52 of FIG. 11. A first multiple conduit 140 energizes lamps in bank 33. Although twelve lamps are provided in bank 33, only four conduits are utilized to develop the "+," "—," and "1" presented from time to time on this bank. Eighteen conduits are grouped in each of the cables or harnesses 141 and 142 associated, respectively with banks 35 and 37.

The switches as at 143, 144 and 145 associated, respectively, with the lamps and banks 37, 35 and 33, are of the type previously described in connection with the time programmer—being made up of the contact arms 61 and 62 as seen in FIG. 9. Here, it will be appreciated that although a wiring diagram has not been shown for the time programmer, the switches are similarly interconnected between a power source as at 139 and banks of lamps. For the temperature programmer, additional circuitry is required inasmuch as the illumination of the lamps does not follow a predetermined, i.e., chronological sequence. This additional circuitry involves the sled-engaged switches 117–120. The switch 117 is the one that is actuated when the temperature is decreasing (but above zero). The switch 117 is normaly open (as shown in the central portion of FIG. 20), the contact 117a being held in the illustrated position by the plunger 126 (see FIG. 15). When the temperature drops and the lever 109 pivots counterclockwise, the contact 117a interconnects the leads 146 and 147. Lead 147 is a "hot" line, being connected to the plug as at 139a. The line 146 completes a circuit to ground via connection 139b in plug 139. Upon current flow from the line 147 to the line 146, the coil 148 of relay 149 is energized to close contacts 150 and 151 and open contacts 152. Upon the closing of contacts 150 and 151, current is enabled to flow through the line 153 (arranged in parallel with the relay coil 148) and to the drive motor 130. This actuates the sled 125 for movement until the contact 117a is returned to the illustrated position. Thereupon current ceases to flow in the circuit made up of line 146, parallel safety switches generally designated 154, normally closed relay contact 155 associated with relay 156, relay contacts 150 and 151, and drive motor 130. Similarly, current no longer flows in the relay coil 148, thereby changing the configuration of the contacts 150–152 to that illustrated in FIG. 20.

The opening of the relay contact 152 precludes energization of the second motor 132, as might be the case where the contacts arms 118a were moved shortly after initial movement of the sled 125.

The foregoing protective feature can be better appreciated when it is understood how the switch 118 operates to move the sled 125 upon increase in above zero temperatures. The switch is normally closed, as shown, but upon clockwise movement of the lever 109, the arm 118a moves to the alternative position and couples the "hot" line 147 to a switch output line 157. This line conducts current through another parallel set of safety switches 158 through the normally closed contact 152 associated with the relay 149 and then to the relay coil 159 associated with the relay 156. Energization of the relay coil 159 opens the normally closed contact 155 and closes the contacts 160 and 161. This then delivers current to the other drive motor 132. Thus the contacts 152 and 155 constitute interlocks for the "opposite" motors. The contact 152 is associated with the relay 148 which is responsible for the actuation of the motor 130, but the contact 152 serves to lock out the motor 142. Conversely, the interlocked contact 155 is associated with the relay 156 which is responsible for the energization of the motor 132. The interlocked contact 155, however, is interposed in the current line leading to the relay 149 associated with the other motor 130.

A further protective feature exists in the provision of line 162 and line 163 which conduct current from the relays 149 and 156, respectively, to a normally open switch 164. The switch 164 is associated with a cam provided on each of the drive motors 130 and 132 and is the counterpart of switch 83 associated with the time programmer motor 76. This insures that the motor 130 or the motor 132, as the case may be, will make one complete revolution irrespective of the travel of the sled required to change the setting of the switch contact 117a or 118a, respectively. It will be appreciated that temperatures which are less than one degree are often encountered and which are sufficient to pivot the lever 109 sufficiently to break or make contact. This would normally result in just a slight movement of the sled—in some instances sufficient to overcome the actuating signal—but the lobed cams associated with the motors would not be turned sufficiently to convert the temperature reading from one degree to the next. This could result in the lamp bank attempting to present two temperatures simultaneously, say, "87" and "88," which would be meaningless to the viewer. Thus, the cam actuated switch 164 takes over once either relay 149 or 156 has been energized to insure that current is delivered to the particular drive motor 130 or 132 until at least one revolution has been completed. The self-governing feature is automatically stopped at the end of one revolution inasmuch as the actuation of switch 164 is dependent upon a cam provided on the drive motor (similar to the cam 78 provided in time programmer). It will be noted that the switch 164 is effectively arranged in parallel with the switches 117–120, the switch 164 being connected to the "hot" line 139a.

All of the foregoing has to do with temperatures above zero—the switches 119 and 120 being inoperative under such a temperature condition. At zero, the switch 124 (see FIG. 15) is actuated by the linkage 108, and this results in movement of the switch contact 124a from the normally open position shown in FIG. 20 to the alternative position wherein line 139a is coupled to line 165 instead of line 147. The line 165 is coupled to the coil 166 of relay 167, and energization of the coil 166 changes the normally closed contact 168 so as to deliver current to line 169 in preference to line 147. It will be seen that line 169 leads to the switches 119 and 120, so that upon repositioning of the contacts 119a and 120a, energization of the associated drive motor occurs to reposition the sled 125 in the manner previously described.

The relay 167 also carries a second contact as at 170 which is responsible for changing the "+" to "—" at temperatures of zero and below. It will be seen that the relay contact 170 leads to the line 171 associated with the lamp bank 33 so that, upon opening of the contact 170, certain bulbs are no longer illuminated and the "—" appears.

The parallel-arranged safety limit switches 154 and 158 are employed to prevent the occurrence of anomalous situations. For example, using the lobed cams and where the reading is 119° above zero, one additional step would bring the reading to zero. This is avoided by the switches 172 and 173 provided as part of the parallel arrangement generally designated 158. The switches 172 and 173 are provided in the temperature programmer and are actuated whenever the reading is 119° to prevent further rotation of the actuator-carrying shafts with further increase in temperature. Ordinarily, the actuator-carrying shafts in the temperature programmer (corresponding to the shafts 55 and 56 in the time programmer) are actuated by the worm shaft 131. The switch 172 is associated with the actuator shaft regulating the operation of the lamp bank 35—the bank that illuminates the "11" portion of "119". Switch 172 is maintained in a closed position except when the actuator shaft is disposed to energize the lamps corresponding to "11". The switch 173 is associated with the actuator shaft regulating and controlling the bank 37, and this switch 173 is closed except when the numeral "9" is presented. Thus, every time the temperature ends in a "9," i.e., "59," "69," etc., the switch 173 opens, but except at "119," current is permitted to flow through the parallel path including switch 172.

Conversely, during the time the temperature is in the range 110–119°, the switch 173 is open, but until "119" is reached, the switch 173 is closed. It will be noted that the switches 172 and 173 are associated with the switches 118 and 120—the switches responsible for causing the absolute value of the temperature to increase.

The other pair of parallel safety switches generally designated 154 and which include switches 174 and 175, are held closed by the lobe cam actuators except in the zero position of their respective actuating shafts. This is advantageous in avoiding any anomalous situation should the switch 124 be slow to act as the temperature reaches zero. It will be appreciated that with the mechanical arrangement described, small movements are utilized to develop temperature information. The materials of construction may become slightly deformed either by mechanical working or temperature effects, so that the switch contact 124a might not in fact close until the temperature reached "−1." If the actuating shafts were not constrained as they reach their zero position, one further step would result in the illumination of lamps corresponding to 119°. However, the switches 174 and 175 associated with the two actuator shafts restrict current flow to the drive motors at zero until the switch 124 can take over and rotate the actuator shafts properly. For example, the switch 174 is associated with the bank 35 and, in the absence of actuation of the switch 124, a drop in temperature to −1° would result in the illumination of the bank 35 to show an "11." However, after the switch 124 is actuated to permit the sign to show negative temperatures, the actuator shaft associated with switch 174 is permitted to rotate in the opposite direction so as to show a "1" when −10° is reached.

While in the foregoing specification a detailed description of an embodiment of the invention has been set down for the purpose of explanation, many variations in the details herein given may be made by those skilled in the art without departing from the spirit and scope of the invention.

I claim:
1. A display, comprising a bank of electric lamps adapted to be energized for the presentation of numerical information, and a programmer adapted to selectively energize said lamps, said programmer including a frame, a plurality of shafts journaled in said frame, gear means interconnecting said shafts, and means responsive to an information signal for actuating one of said shafts, each shaft being equipped with a plurality of lobe-equipped disc actuators, a switch on said frame for each actuator and positioned adjacent the shaft associated with said actuator, each switch being connected to at least one lamp, said frame being equipped with means for simultaneously actuating all switches associated with a given shaft to monitor said lamps, said actuating means containing a portion movably mounted proximate each shaft and switch on said frame and actuator means for moving each portion into engagement with each switch for simultaneously actuating all said lamps.

2. A display, comprising a bank of electric lamps adapted to be energized for the presentation of numerical information, and a programmer adapted to selectively energize said lamps, said programmer including a frame, a plurality of shafts journaled in said frame, gear means interconnecting said shafts, and means responsive to an information signal for actuating one of said shafts, each shaft being equipped with a plurality of lobe-equipped disc actuators, a switch on said frame for each actuator and positioned adjacent the shaft associated with said actuator, each switch being connected to at least one lamp, said programmer including a sled mounted on said frame for conjoint movement with said one shaft, switch means engageable by said sled, and means carrying said switch means for movement on said frame in response to a change in temperature, said switch means being coupled to said signal-responsive means for actuating the same.

3. The structure of claim 2 in which said sled is equipped with an axially split, internally threaded member constructed of plastic material, and a second threaded member on said frame coupled to said signal-responsive means in engagement with said internally threaded member.

References Cited
UNITED STATES PATENTS

| | | | |
|---|---|---|---|
| 683,133 | 9/1901 | Mason | 340—338 |
| 1,120,971 | 12/1914 | Queen | 340—338 |
| 2,673,976 | 3/1954 | Williams | 340—338 |
| 2,907,995 | 10/1959 | Justus | 340—338 X |
| 2,917,733 | 12/1959 | Justus | 340—334 |
| 3,015,094 | 12/1961 | Reynolds | 340—338 |
| 3,041,596 | 6/1962 | Caferro | 340—338 |
| 3,166,742 | 1/1965 | Sherwin | 340—334 |
| 3,255,442 | 6/1966 | Kimberlin | 340—334 |
| 3,273,139 | 9/1966 | Flactiff et al. | 340—334 |

THOMAS B. HABECKER, *Acting Primary Examiner.*

NEIL C. READ, *Examiner.*

R. M. GOLDMAN, A. J. KASPER,
*Assistant Examiners.*